UNITED STATES PATENT OFFICE.

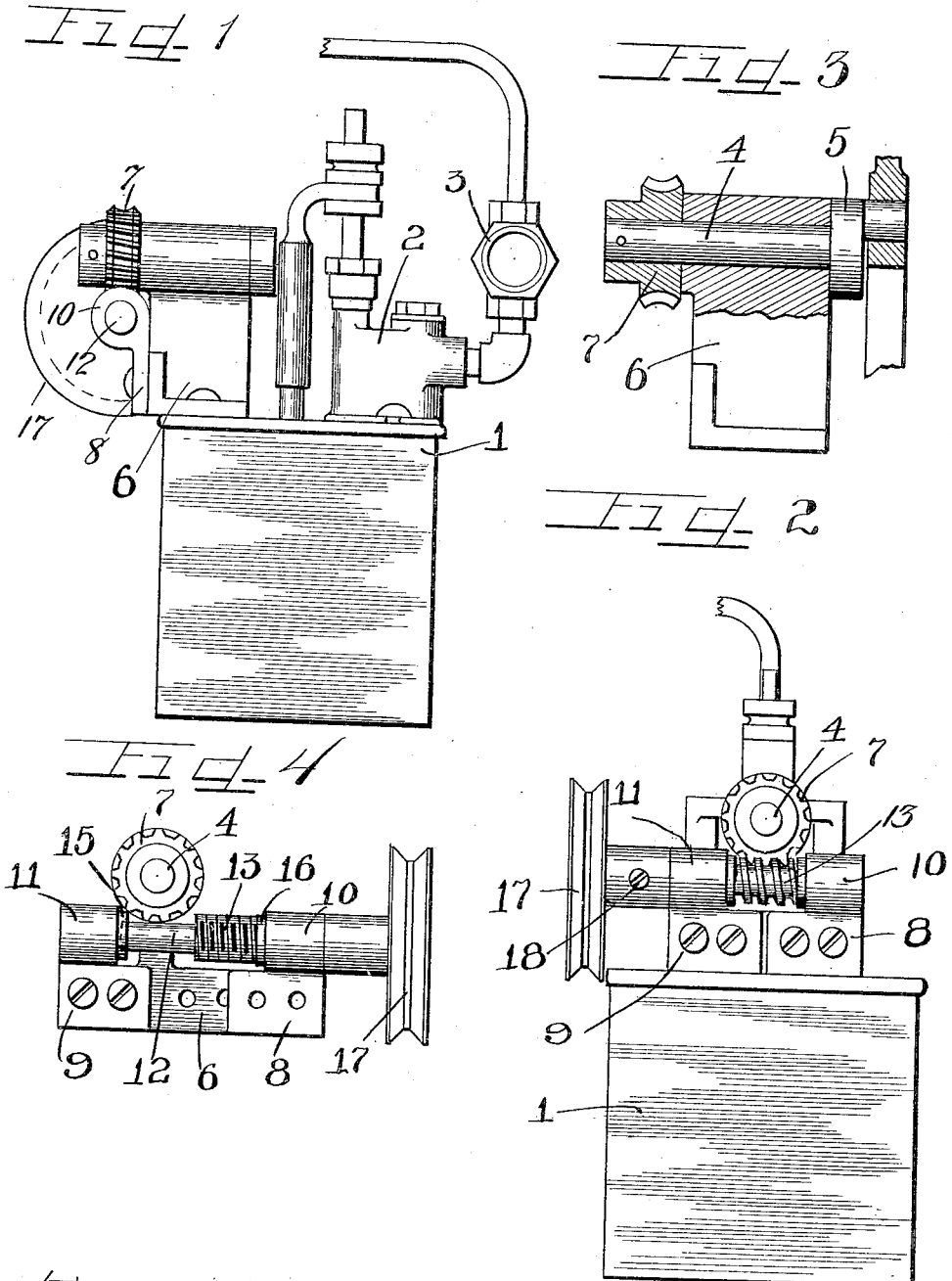

THOMAS A. DELANEY, OF CHICAGO, ILLINOIS, ASSIGNOR TO HILLS-McCANNA COMPANY, A CORPORATION OF ILLINOIS.

DRIVE FOR LUBRICATORS.

1,131,340.      Specification of Letters Patent.      Patented Mar. 9, 1915.

Application filed October 12, 1910. Serial No. 586,599.

*To all whom it may concern:*

Be it known that I, THOMAS A. DELANEY, a citizen of the United States, and a resident of the city of Chicago, in the county of Cook and State of Illinois, have invented certain new and useful Improvements in Drives for Lubricators; and I do hereby declare that the following is a full, clear, and exact description of the same, reference being had to the accompanying drawings, and to the numbers of reference marked thereon, which form a part of this specification.

Force feed lubricators, extensively used for lubricating steam engines and for very many other purposes, are usually driven from some moving part of the mechanism to be lubricated, and it frequently occurs that the space available for installation of the lubricator is restricted so that it may be necessary at times to drive or operate the lubricator from either side depending upon the arrangement of related parts. As heretofore constructed, it has frequently been inconvenient to effect the change and additional expense has occurred thereby.

The object of this invention is to afford a driving mechanism for lubricators of such a nature as to enable the driving connections to be shifted so that the machine may be operated from either side thereof with a trifling adjustment.

It is also an object of the invention to afford a construction in which the driving shaft for the lubricator is so journaled and supported as to permit the same to be quickly turned in its bearings to enable the driving connections to be applied at the opposite side of the lubricator.

The invention consists in the matters hereinafter described and more fully pointed out and defined in the appended claim.

In the drawings: Figure 1 is a side elevation of a device embodying my invention. Fig. 2 is a rear end elevation thereof. Fig. 3 is an enlarged vertical section taken through the pump shaft. Fig. 4 is a fragmentary view similar to Fig. 2, but showing the shaft in the act of being reversed.

As shown in said drawings, the lubricator tank 1, and the pump 2, sight feed 3, pump shaft 4, and crank 5, are substantially the construction shown in the prior patent for "lubricator," issued to T. A. Delaney and B. T. McCanna on the 2nd day of October, 1900, No. 659,166. Said pump shaft is journaled upon a bracket 6, screwed upon the tank and affording a relatively broad transverse face slightly projecting beyond the rear edge of the tank. Secured on said pump shaft 4, is a worm gear 7. Removably secured upon the flat rear face of the bracket 6, one on each side of and below the pump shaft 4, are brackets 8 and 9, at the top of which and integral therewith are bearing boxes 10 and 11, in which is journaled the driving shaft 12. Said driving shaft is provided near one end thereof with a worm 13, which may be rigidly secured thereon in any convenient manner or may be constructed integrally with the shaft, as preferred, and which meshes with the worm gear 7, when the shaft is journaled in said bearings, as shown in Fig. 2, or when turned end for end and journaled in said bearings.

15 and 16, indicate loose collars on said shaft, one at each end of the gear and which fill the space between the ends of the worm and their bearings, and as shown, a driving wheel or pulley 17, is removably secured upon the outer end of said driving shaft by means of a screw 18, which extends through the hub thereof and binds upon the shaft.

The operation is as follows: Having secured one of the brackets, as, for instance, 9, in place, the shaft 12, with the collars 15 and 16 properly located thereon, is inserted into said bearing, and the worm 13 and worm gear 7 brought into mesh. The other bearing 8 may then be secured in place engaging one end of said shaft 12, and the driving pulley 17 connected on the other end of said shaft, as seen in Fig. 2. Should it be desired to turn said shaft end for end, to enable the drive to be effected on the opposite side of the machine, the same may quickly be effected by removing the driving pulley 17 from the shaft 12, then detaching the bearing 8, whereupon the shaft 12 and its collars 15 and 16 may be removed and reversed. Upon again attaching pulley 17 to the end of shaft 12 now projecting beyond bearing 8, and readjusting said bearing to position, the position of pulley 17 will be reversed, as shown in Fig. 4, wherein the parts are shown in the act of being replaced.

Obviously details of the construction may be varied. Any suitable number of bearing boxes may be employed, and it is quite immaterial whether the driving shaft be driven from a grooved pulley, as shown, or from any other suitable connection for rotating the same.

I claim as my invention:

A device of the class described, comprising a worm gear, a shaft therefor, a bracket in which said shaft is journaled, a worm, a worm shaft to which said worm is fixed, a pulley removably secured on one end of said worm shaft, a pair of brackets removably mounted on said worm gear shaft bracket, bearings carried by said brackets for supporting said worm shaft and adapted to engage the same on opposite sides of said worm, said worm shaft and worm being adapted to be removed and reversed upon the removal of said pulley and one of said worm shaft brackets.

In testimony whereof I have hereunto subscribed my name in the presence of two subscribing witnesses.

THOMAS A. DELANEY.

Witnesses:
CHARLES W. HILLS, Jr.,
LAWRENCE REILESTEIN.

Copies of this patent may be obtained for five cents each, by addressing the "Commissioner of Patents, Washington, D. C."